Figure 1:
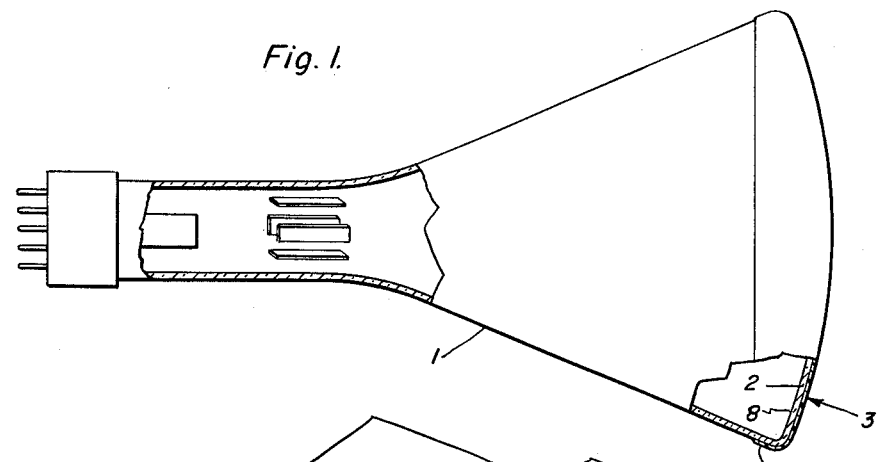

May 18, 1965   R. P. ANDERSON   3,184,327
IMPLOSION RESISTANT CATHODE RAY TUBES
Filed July 17, 1962

Inventor:
Robert P. Anderson,
by Joseph T. Cohen
His Attorney.

United States Patent Office 3,184,327
Patented May 18, 1965

3,184,327
IMPLOSION RESISTANT CATHODE RAY TUBES
Robert P. Anderson, Scotia, N.Y., assignor to General
Electric Company, a corporation of New York
Filed July 17, 1962, Ser. No. 210,346
11 Claims. (Cl. 117—63)

This invention is concerned with coating surfaces with cellulosic compositions and cathode ray tubes implosion-proofed with such compositions. More particularly, the invention relates to a process for coating a surface or substrate with a cellulosic gel lacquer to obtain transparent, essentially strain-free and wrinkle-free coatings, which comprises (1) coating the surface with a cellulosic gel comprising (a) a cellulosic composition, (b) an inert swelling liquid for the cellulosic composition, and (c) an aliphatic (either saturated or unsaturated) monohydric alcohol of from 2 to 5 carbon atoms, the combination of (a) and (b) acting as a solvent mixture for the cellulosic composition, and (2) immersing the coated cellulosic surface in a liquid medium composed essentially of the aforesaid aliphatic alcohol (or mixtures of alcohols) for a time sufficient to remove at least 20% of the swelling agent present in the solvent mixture for the cellulosic composition. The invention also is concerned with surfaces coated with the aforesaid cellulosic gel lacquer, particularly the use of such cellulosic gel lacquers as implosion, resistant barriers for cathode ray tubes, such as television viewing tubes.

The term "cellulosic gel lacquer" as employed in the specification and in the appended claims is intended to mean a solution of a cellulosic composition [e.g., cellulose acetate (including cellulose di- and triacetate), cellulose propionate, cellulose butyrate, cellulose acetate propionate, cellulose acetate butyrate, and ethyl cellulose] in a solvent mixture of a liquid swelling agent for the cellulosic composition, and a monohydric aliphatic alcohol of from 2 to 5 carbon atoms which is a non-solvent at room temperature (about 20–30° C.) for the cellulosic composition. The combination of the swelling agent, which is also a non-solvent for the cellulosic composition, and the aliphatic alcohol together are intended to include only those compositions which combined act as a solvent for the cellulosic composition at room temperature. Since the temperature at which the "cellulosic gel lacquer" may be employed will determine the viscosity of the lacquer, it is intended that the aforesaid term "cellulosic gel lacquer" in the specification and claims includes not only solutions of the aforesaid cellulosic compositions in a more fluid and flowable form (for instance, when used at temperatures of about 45–65° C.) but also includes the less flowable and, therefore, a gel-like form of the cellulosic gel lacquer when the latter is employed at temperatures below 45° C., for instance, from about 20–40° C., where the aforesaid lacquer has a much higher viscosity and has the characteristics of a true gel in which the cellulosic composition acts like the solid phase of a colloidal solution. At the lower temperatures, the cellulosic gel lacquer is extrudable as a rubber-like, elastic film.

Because of their colorless transparency and their good strength and abrasion resistance, cellulosic compositions have in the past been used for various coating purposes, particularly as protective coatings for substrates such as wood, metal, glass, etc. Generally, the method for applying coatings of cellulosic compositions has been to form solutions of the cellulosic composition, dipping the surface or object desired to be coated in the solution, and allowing the coated surface thereafter to dry either at room temperature or at elevated temperatures in order to remove the solvent. In a large number of applications, the type of coating obtained with the cellulosic composition must be smooth, homogeneous, free of stresses and strains (which may adversely affect the coating in different types of environment) and be essentially wrinkle-free. One of the more important uses for which cellulosic compositions can be employed is as a reinforcing and implosion protective barrier for evacuated cathode ray tubes (such as television picture tubes). Reinforcement of the envelope of such tubes is desirable in the event of abrupt devacuation, such as in an implosion, in order to minimize scattering of glass fragments.

Usually, a shield is placed in front of the television picture tube to restrict scattering of glass fragment in the event of implosion. Heretofore, this protection has sometimes taken the form of a separate sheet of safety glass or a sheet of plastic such as plasticized cellulose butyrate or styrene. However, each of these materials has its disadvantages. Safety glass is heavy, expensive, and requires special cabinet design. Polystyrene and plasticized cellulose butyrate, although being lighter, less expensive, and easier to use, are quite soft and easily marred. Both the glass and plastic protective layer systems have the major disadvantage in that the separate shield (i.e., positioned in a non-contacting manner) provides two additional reflecting surfaces which undesirably reduce the optical clarity of the television image.

Another method for providing an implosion barrier involves using a second molded glass plate which is laminated to the television tube face by means of a thick, rubbery interlayer. Again, these are expensive, difficult to manufacture, and add a substantial undesirable increase in the weight of the resulting television sets, particularly to portable television sets. A still further approach to this implosion protection problem involves vacuum forming a plastic sheet directly onto the faceplate of the television tube. However, materials which would have the properties of abrasion resistance, clarity, etc., required for such an application, are expensive and extremely difficult to vacuum-form. In order to make these materials more conducive to commercial utilization, it is often necessary to add softening agents or plasticizers to the plastic prior to vacuum forming and this in turn reduces the abrasion resistance of the surface. Finally, the materials which would qualify for such an implosion barrier are extremely expensive.

A review of the requirements of an implosion barrier for television tubes reveals that the implosion barrier which advantageously is about 10 to 50 mils thick in addition to being strong enough to contain an implosion, must also be free of blemishes such as bubbles, wrinkles, orange peel, strains, etc., must be transparent and waterclear, and must maintain adhesion to the glass under severe environmental conditions, such as changes in temperature, and changes in humidity. Additionally, the implosion barrier must have good abrasion resistance to environmental conditions to which the barrier might be subjected. Finally, the process for applying the implosion barrier has to be relatively simple and inexpensive, involving compositions for the barrier itself which are themselves relatively inexpensive and available.

The cellulosic gels of the type described above would be admirably suitable for use as implosion barriers for television tubes and also would be highly useful in coating other objects and types of equipment such as bowling pins, coatings for furniture, either for protective or decorative purposes, etc. However, in order to use the cellulosic gel lacquers, it has been found that great difficulty has been encountered in obtaining clear, smooth, stress-free and wrinkle-free surfaces. This in part has been due to the method whereby these cellulosic lacquers have been applied to the substrate and the liquid phase removed from the solid cellulosic composition.

It is accordingly one of the objects of this invention to apply coatings of cellulosic compositions which are substantially strain-free, wrinkle-free and have good optical clarity and are transparent and free from optical aberrations.

It is another object of the invention to obtain substantially strain-free and wrinkle-free coatings of cellulosic compositions by relatively rapid and economical removal of the solvent from the cellulosic gel lacquer used to form the cellulosic coating.

It is a still further object of the invention to provide a process for coating substrates and articles with a cellulosic gel lacquer which is economically attractive and adaptable to mass production techniques.

An important object of the invention is to provide a cathode ray tube having improved integral reinforcement against implosion and requiring no glass safety plate.

Still another object of the invention is to provide a light weight implosion-resistant television picture tube which has an implosion barrier on the face portion thereof substantially free of strains and wrinkles and which has good optical clarity.

It is a still additional object of the invention to provide an implosion barrier for a television picture tube made of a cellulosic composition which is strongly adherent to the glass face of the television tube without the need for mechanical anchoring devices, and is resistant to changes in temperature and to high humidity conditions.

Other objects of the invention will become more apparent from the discussion which follows.

Pursuant to my invention, I have unexpectedly discovered a method for applying cellulosic gel lacquers readily and economically to various objects and substrates, particularly to viewing surfaces of television tubes as implosion barriers to yield wrinkle-free, stress-free, and highly abrasion-resistant surfaces having good optical clarity, provided that the surface coated with the cellulosic gel lacquer is treated in a specified manner after application of the gel lacquer. In accordance with my process, after the surface is coated with the cellulosic gel lacquer, the coated surface is immersed in a monohydric aliphatic alcohol of the type described above, which assists in and hastens the removal of the swelling agent in the gel lacquer, thereby allowing the remaining swelling agent and aliphatic alcohol in the cellulosic gel solvent to be removed at an accelerated rate during subsequent drying action, consistent with the attainment of a strain-free and wrinkle-free surface. The aliphatic alcohol retained in the gel body after immersion in the aliphatic reservoir but before complete volatilization of the gel solvent allows the coating to remain pliable so that it can air dry wrinkle-free and strain-free. The necessity for attainment of surfaces which are wrinkle-free and strain-free, is accentuated by the problem of coating curved surfaces or applying a coating continuously around corners of a surface. Thus, in order to apply the cellulosic gel lacquer satisfactorily to a television tube, it is necessary not only to coat the curved faceplate, but also to bring the gel lacquer around the edges of the faceplate (and around the peripheral flange and funnel portion) in the direction of the neck of the tube or implosion barrier to the television tube.

Previous attempts to use cellulosic gel lacquers for the above purposes have not been satisfactory for the following reasons. The cellulosic gel lacquer, which is a highly viscous solution has a high viscosity temperature coefficient and cooling rapidly increases the viscosity with gelation occurring around 20 to 35° C. Thus, when an object is coated with the cellulosic gel lacquer, a hard, non-tacky skin is formed almost immediately, due to cooling and solvent loss. This is followed by a slower gelation due to further loss of solvent and cooling of the remainder of the material under the skin. The inherent advantage in using the gel lacquer is that this behavior of the prompt skin formation and the slower gelation of the remainder of the material under the skin, permits the formation of thick films (as great as 100 mils or more thick) in a single coating operation with no undersirable draining or running of the coating composition. However, the formation of such thick films and their subsequent drying, particularly the rapid drying of the surface skin, is the basis for the problems discussed above, such as strains, wrinkles, bubbles, etc. Any flow of the non-gelled material under the surface skin can cause the above wrinkles and other surface irregularities. This is especially true at the edges and corners, where drying stresses are usually encountered. Therefore, the temperature and solvent loss must be carefully controlled after dipping, so that there is enough flow to give a uniform coating but not enough to cause surface irregularities. It is this problem which has been essentially unsolved in connection with the reproducibility and high rate of production required in a television tube manufacturing operation.

It is has been found that during the drying process the gelled coating must shrink around 50 to 75% in the vertical direction. The film, because of adhesion to the base (and because of the geometry involved of coating around corners and edges) cannot shrink in the lateral directions. This results in a highly strained film which is the major source of the adhesion problem (i.e., adhesion of the plastic coating to the glass substrate) encountered when one attempts to use cellulosic gel coatings.

The strains introduced by prior art attempts to use these cellulosic gel lacquers are similar to the biaxial strains produced by stretching a film in two dimensions. In a uniform film, these strains are present but no birefringence is observed under a polariscope, except in the areas around corners, edges, bubbles, and other imperfections. These irregularities also provide the stress concentration points from which adhesive failure is initiated. While the film is shrinking vertically during the drying, the surface of the film is shrinking slightly laterally. This decrease in surface area is sufficient to shrink out most of the surface irregularities which occur during dipping and drying, except for gross defects or where excessive subsurface flow has occurred. As mentioned above, this is most severe when the gelation is slow and at corners and edges where drying stresses are concentrated.

Taking for example, gel lacquers of cellulose acetate propionate as the cellulosic material, it is found that with this composition (which has a softening point of 200–210° C. and a heat distortion temperature in the region of 130° C.) stress relief could be obtained with gel coatings made from cellulose acetate propionate by heating for many hours at 125–130° C., but rapid and complete strain relief was achieved only by heating to 150–175° C. However, in order to attain this final result at the more elevated temperatures, the cellulose acetate propionate discolors, degrades and embrittles. Furthermore, in using these cellulose acetate propionate gel lacquers in the accompanying drying cycle at elevated temperatures, all solvents and absorbed water had to be completely removed to avoid bubble formation and foaming at the elevated temperatures. Bubble formation is a problem whenever cellulose acetate propionate gel coatings are dried above 50° C. and becomes extremely troublesome above 100° C., where water, isobutanol (107° C.) and toluene (112° C.) boil, the latter two ingredients acting as the solvent for the cellulose ester. It is only by using very slow, tedious, programmed heating from 60°–175° C., that satisfactory stress release without bubble formation was attained. However, such an extended heat treatment is not suitable to the mass production of television tubes.

By allowing a surface freshly coated with cellulosic gel lacquer (to thicknesses of from 5 mils to 100 mils or more) to come in contact with an aliphatic alcohol in accordance with my invention, the excess hardness of the skin formed when the cellulosic gel coating is exposed to the air, is prevented and thus stresses are reduced, wrinkling is minimized and essentially prevented, and the adhesion and appearance of the cellulosic coating to the substrate is materially improved. It is important in carrying out this so-called drying step whereby the outer coating of the cellulosic gel coating is uniformly caused to dry, that one employ a non-solvent for the cellulosic composition; at least the liquid must be a non-solvent at room temperature or at the temperature at which the liquid is used as the drying agent. Although some of the alcohols are solvents for the cellulosic composition at elevated temperatures, this in no way affects the ability of the aliphatic alcohol to act also as a drying (and extracting) agent. If a solvent mixture is used in place of the nonsolvent, aliphatic alcohol, for instance, if one employs a mixture of isobutanol and acetone (or even acetone itself) for softening the cellulose acetate propionate surface, and attempts to use a series of dips to keep the outer surface of the cellulosic coating soft, although some improvement in strain and adhesion are noted, nevertheless, such films have a rough, orange-peel surface and show numerous solvent marks. This is believed due to the fact that when the cellulosic film is immersed in the solvent (or its vapors) it immediately swells, increases in surface area and wrinkles. With sub-surface movement of the gel lacquer, these wrinkles do not completely disappear on further drying.

The cellulosic ether and ester compositions employed in the practice of the present invention are well-known in the prior art and may be any one of those which have been previously recited, are hydrophobic and at room temperature, in the absence of any solvent, are hard, abrasion-resistant compositions. For instance, a useful cellulose acetate which may be employed is cellulose triacetate which contains about 43–44% acetyl groups. Another cellulose acetate is cellulose diacetate, which is prepared from the triacetate by partial hydrolysis; the theoretical acetyl content of the cellulose diacetate is about 35%. Finally, there is a cellulose monoacetate which contains 21.1% acetyl groups. It is thus apparent that commercial cellulose acetate is available in a wide range of acetyl content, depending on the use to which it is to be put. The cellulose propionate may be completely esterified (thus having a propionyl content of about 67% calculated as propionic acid) or it may have a propionyl content between 63 and 65%. Cellulose acetate propionate and cellulose acetate butyrate contain in addition to acetyl groups (in amounts of, e.g., 5 to 20%), propionyl groups and butyryl groups, respectively (in an amount of from 15 to 35%). Examples of cellulose propionate gel lacquers are found in U.S. 2,652,346, issued September 15, 1953. Cellulose acetate is sold by Celanese Corporation of America, cellulose acetate propionate is sold by both Celanese Corporation of America and Eastman Chemical Products, Inc., and cellulose acetate butyrate is sold by Eastman Chemical Products, Inc. Ethyl cellulose is an example of a cellulosic ether which can be employed. Although all the usual forms of ethyl cellulose can be used, I prefer to use one in which the ethoxyl content ranges from 46.8 to 49.5 percent, although ethoxyl contents as low as 43.5 percent are not precluded. Ethyl cellulose is sold by Dow Chemical Company, and advantageously contains at least 2 and preferably above 2.4 ethyl groups per cellobiose unit. The cellulosic composition used may be any of those having viscosities of about 0.1 to 2.0 seconds as determined by ASTM Method D–H71–48, Formula B. The presence of small percents, e.g., from 0.1 to 5% hydroxyl groups is not precluded.

Among the liquid, compatible (i.e., forming clear films with the swelled cellulosic composition), swelling, non-solvating agents for the cellulosic composition may be mentioned, for instance, aromatic hydrocarbons (e.g., toluene, xylene, benzene, mesitylene, etc.); halogenated aromatic and halogenated aliphatic hydrocarbons, both saturated and unsaturated, of from 1 to 4 carbon atoms (e.g., monochlorobenzene, dichlorobenzene, methylene chloride, tetrachloroethylene, trichloroethylene, trichloroethane, tetrachloroethane, the various isomers of butyl chloride, propyl bromide, trichlorobutane, etc.; esters of saturated aliphatic monohydric alcohols of from 1 to 4 carbon atoms and a saturated aliphatic monocarboxylic acid of from 2 to 6 carbon atoms boiling preferably below 150° C. at atmospheric pressure (e.g., ethyl acetate, amyl acetate, ethyl propionate, isopropyl acetate, butyl acetate, butyl propionate, etc.) etc.

The aliphatic alcohols used with the liquid swelling agents may be, for instance, ethanol, isopropanol, n-butanol, 2-isobutanol, isobutanol, various isomeric amyl alcohols, allyl alcohol, methallyl alcohol crotonyl alcohol, etc. Generally, the monohydric aliphatic alcohol contains from 2 to 5 carbon atoms, boils below 150° C., and advantageously below 125° C., and is not a solvent for the cellulosic composition at room temperature but may be (although not necessarily) a solvent at elevated temperatures, for instance, at about 65–150° C.

The ratio of the swelling agent to the aliphatic alcohol, although it can be varied within a wide range, is preferably, on a weight basis, within the range of from 3 to 15 parts of the swelling agent per part of the aliphatic alcohol. Percentagewise, the swelling agent advantageously comprises from 75 to 95% of the total weight of the latter and the aliphatic alcohol. The solids content of the cellulosic composition in the cellulosic gel lacquer (comprising the cellulosic composition, swelling agent and the aliphatic alcohol) can also be varied fairly widely and advantageously, for coating purposes, is of the order of from 10 to 40%, by weight, based on the total weight of the ingredients. In one instance, cellulose acetate propionate gel lacquer which has been used with considerable success comprises on a weight basis 25% cellulose acetate propionate, 68% toluene, and 7% isobutanol. A general range of ingredients in making the cellulosic gel lacquers used in the present invention comprises the following on a weight basis:

|  | Percent |
| --- | --- |
| Cellulosic composition | 15 to 40 |
| Liquid swelling agent | 50 to 75 |
| Aliphatic alcohol | 2 to 15 | the total percentages in the above table equalling 100%.

The aliphatic alcohol used as the immersion liquid (also referred to as "alcohol reservoir") for the freshly coated cellulosic gel lacquer can be any one of those used as the monohydric aliphatic alcohols used in forming the solvent for the cellulosic composition. Although I do not wish to be held to my understanding of what happens when the cellulosic gel lacquer is immersed in the aliphatic alcohol, it is believed that the liquid alcohol acts as a heat sink for the full thickness of the coating and rapidly cools the gel coating thereby hastening gelation and preventing flow. Increasing the temperature of the aliphatic alcohol reservoir above room temperature (above about 20° C.) slows the gelation while decreasing the temperature below room temperature hastens the gelation. Generally, temperatures around 0° C. cause such rapid gelation that levelling flow does not occur and all coating irregularities are frozen into the coating. It is also believed that the hydrostatic pressure exerted against the gel coating helps promote a uniform film. The incorporation of small amounts of aromatic hydrocarbons such as benzene, xylene, toluene, etc., in the aliphatic alcohol reservoir (used for dipping the cellulosic surface), for instance, amounts of from about 0.1 to 10%, by weight, of the aromatic hydrocarbon based on the weight of the aliphatic alcohol reservoir, may advantageously be employed to keep the skin of the cellulosic gel lacquer more pliable to produce a smoother gel coating.

Although the above-described drying method effects considerable improvement in anchoring the cellulosic gel lacquer to substrates, particularly glass substrates, nevertheless under excessive humidity conditions, the bond between the cellulosic composition and the glass substrate is seriously weakened leading to failure of the bond. I have unexpectedly found that this problem can be obviated by employing between the glass substrate and the cellulosic coating, a primer-cushion layer system. In addition, the possibility of strains and wrinkles occurring in the cellulosic coating is still further reduced. This primer-cushion layer acts interdependently, for the use of one member of the system without the other does not give the results obtained by using the two-member system.

Among the compositions which can be employed as the primer member of this system are those having the Formula I, $R_mSiX_{4-m}$, where R is an organic radical, for instance, alkyl (e.g., methyl, ethyl, propyl, butyl, isopropyl, amyl, etc.); aryl (e.g., phenyl, biphenyl, etc.); aralkyl (e.g., benzyl, phenylethyl, etc.); alkaryl (e.g., tolyl, xylyl, etc.); alkenyl (e.g., vinyl, allyl, butenyl, styryl, etc.); the $NH_2(CH_2)_n-$ radical; the $CN(CH_2)_n-$ radical; the

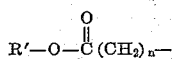

radical; the $R''O-(CH_2)_n-$ radical; where $R'$ is an alkyl hydrocarbon radical of from 1 to 5 carbon atoms (e.g., methyl, ethyl, propyl, butyl, isopropyl, amyl, etc.), $R''$ is a member of the same class as $R'$ and in addition may be hydrogen and the

radical, X is a member selected from the class consisting of hydroxy radicals, halogen (e.g., chlorine, bromine, fluorine, etc.), and alkoxy radicals (e.g., methoxy, ethoxy, propoxy, etc.), $m$ is a whole number equal to from 1 to 2, and $n$ is a whole number of from 1 to 5.

Among the organosilicon compositions which can be employed as primers for the glass substrate and which when hydrolyzed to the organopolysiloxane state improve the adhesion between the glass and the subsequent polymer cushioning layer, are, for instance, ethyltrichlorosilane, phenyltriethoxysilane, benzyltripropoxysilane, cyclopentadienyl trichlorosilane, vinyltrichlorosilane, allyltrichlorosilane, vinyltriethoxysilane, vinyl methyldiethoxysilane, β-cyanoethyltrichlorosilane, β-cyanoethyltripropoxysilane, gamma-cyanopropyltriethoxysilane ethyl carboethoxy trichlorosilane, carboxyethyltriethoxysilane, aminoethyl triethoxysilane, aminopropyltriethoxysilane, hydroxypropyltriethoxysilane, acetoxyethyltrichlorosilane, propoxybutyltriethoxysilane, etc.

In the usual course of using the above-identified organosilanes as primer agents, the silanes are converted to the organopolysiloxane state by hydrolysis of the silicon-bonded hydrolyzable groups, either by the moisture in the air or by subjecting the primed surface to a high humidity atmosphere such as steam. After application of the first member of the primer-cushion system, namely, the organosilane of Formula I, and effecting hydrolysis, it is then necessary to apply to the organopolysiloxane layer on the glass, the other member of the primer-cushion system, namely, a thin, optically clear, cushioning organic layer (i.e., a rubbery or pliable polymeric coating free of silicon, e.g., a polyvinyl ester, for instance, polyvinyl acetate) in a thickness of about 0.1–10 mils, advantageously using either a solution or an emulsion of such organic layer. After application of this second member of the primer-cushion layer, the cellulosic gel lacquer is then applied as described above and dried in accordance with the method outlined above; this yields a greatly improved bond between the cellulosic gel lacquer coating and the glass. This bond is substantially impervious to moisture and highly resistant to temperature extremes (leading to expansion and contraction of the glass) and to extremes in humidity. Instead of using polyvinyl acetate, I can employ other polyvinyl esters as the cushioning coating, e.g., copolymers of vinyl esters (for example, vinyl acetate, vinyl propionate, etc.) with other unsaturated acids or esters (e.g., acrylic acid, methacrylic acid, ethacrylic acid, methyl acrylate, ethyl acrylate, methyl methacrylate, diethyl maleate, dibutyl maleate, etc.), in which the vinyl ester in the copolymer comprises from 10 to 75%, by weight, based on the total weight of the vinyl ester and the other unsaturated acid or ester moiety. Generally, when using polyvinyl acetate, the molecular weight of this material (which is believed to serve as a cushion for any shocks induced by thermal or humidity changes) is of the order of from about 10,000 to 1,000,000 when measured by light scattering. This polymeric cushion must be optically clear and capable of becoming adherent to the cellulosic implosion barrier by the solvating and swelling action of the solvent in the cellulosic gel lacquer.

The extent to which the television tubes are coated with the organopolysiloxane layer, the cushioning layer and the cellulosic composition is important in obtaining maximum protection for the viewer and greatest strength for the cellulosic coated surface. Generally, television tubes are curved at the edge of the faceplate and it is at this curve of the smallest radius of curvature that there exists maximum stress concentration. In addition, the faceplate of the television tube is ordinarily bonded to the balance (neck) of the television tube by a glass frit and again this provides for a potential weakness of the television tube in case of breakage of the tube. For this reason, the cellulosic coating applied to the faceplate should extend across the faceplate to a point on the side of the tube beyond the radius of curvature and beyond the point of fusion (or seal line) of the faceplate to the television viewing tube. Ideally, this cellulosic coating might advantageously extend to the neck of the tube so as to offer additional protection while the tube is being handled. This is another embodiment of the invention but generally is not essential to adequate protection of the television viewer provided adequate precautions are taken in the handling of the tube.

The following examples are given by way of illustration and not by way of limitation as to how the present invention may be practiced. All parts and percents are by weight unless otherwise noted.

Unless otherwise stated, the cellulosic gel lacquer (about 25 percent solids) employed in the following examples was a cellulose acetate propionate of 3.4% acetyl content and 45% propionyl content. The solvent used for making the gel lacquer consisted of isobutanol and toluene in which the two were in a weight ratio of about 10 parts isobutanol and 90 parts toluene.

The cushioning polymer layer used between the vinyltriethoxysilane primer and the cellulosic gel lacquer was an aqueous emulsion of a polymer of vinyl acetate (known as Darex 56L sold by W. R. Grace and Company). This was applied by applying a 55% solids aqueous emulsion on the vinyl silane polymer to a thickness of about 1–3 mils thick. The coating of the vinyl acetate polymer could also be applied in the form of an alcohol solution to the organopolysiloxane primed glass surface. Thereafter, the coated surface was allowed to dry at a temperature of about 50–60° C. to remove the solvent.

The vinyltriethoxysilane primer employed was applied by spraying at a pressure of about 60 p.s.i. an organic emulsion of the vinyltriethoxysilane to give a thin coating (less than about 1 micron) on the glass. The glass could also be dipped into a 10 weight percent solution of vinyltriethoxysilane in ethanol. Thereafter, the coated glass was dried at room temperature for about 5 or 10 minutes to evaporate any solvent, the coating exposed to steam for about 2 minutes to effect hydrolysis of the vinyltriethoxysilane, and thereafter dried at temperatures varying from room temperature to about 75–100° C. to complete the removal of the solvent and convert the organosilicon coating to the cured polysiloxane state.

Generally, the treatment with the gel lacquer consisted in immersing the primed and cushioned glass surface in the cellulosic gel lacquer at a temperature of about 55° C. After dipping, the treated glass surface was removed and then immersed (within 10 to 60 seconds after removal from the gel lacquer) in the alcohol reservoir for about 30–60 minutes. This removed about 20 to 40 percent of the swelling agent. After removal from the alcohol reservoir, the coated assembly was allowed to air-dry at temperatures ranging from room temperature to about 50° C. Since the immersion in the alcohol often brings low molecular weight polymers of the cellulose acetate propionate to the surface, it is usually desirable, after fully drying the cellulosic coating to give the treated surface a benzene rinse to remove these low molecular weight polymers and thereafter further air-drying for about 10 minutes to remove any trace of benzene. It is important that prior to priming the glass surface, the latter is cleaned with the necessary solutions (such as solvents and acids) to remove any traces of grease or other foreign materials or contaminations which might in any way adversely affect the adhesion of the cellulosic compositions thereto or the primers to the glass surface.

*Example 1*

A glass slide about 2" x 2" square was dipped (both sides) in the above-described cellulose acetate propionate gel lacquer and slowly withdrawn from the cellulosic solution. Within a period of 60 seconds after removal from the cellulosic gel lacquer, the coated slide, which by this time had on its surface a thin, hard but pliable skin, was immersed in its entirety in isobutanol liquid and held in the isobutanol for approximately 30 minutes. This treated slide was then removed and allowed to air dry at room temperature (about 20°–30° C.), for about 2 hours and thereafter held for 24 hours at 50° C. The film (which was about 25 mils thick) on the surface of the glass slide was optically clear and substantially free of any wrinkles or apparent strain. The adhesion of the cellulosic film to the glass was fairly good. In contrast to this, when the glass slide was dipped similarly as above in the cellulosic gel lacquer, removed, air dried for 2 hours at room temperature and then for 24 hours at 50° C. without the intermediate dip in isobutanol, the coated surface of the glass showed a large number of wrinkles and strains observed by polarized light. In addition, the adhesion of the cellulosic composition to the glass substrate was inferior to that obtained by using the isobutanol drying treatment.

*Example 2*

In this example, the same procedure and ingredients were employed as in Example 1 with the exception that the drying step was carried out in either ethanol, isopropanol, n-propanol, and n-butanol in place of the isobutanol used in Example 1. In each instance, there was obtained again a clear, wrinkle-free and strain-free cellulosic coating on the glass substrate.

*Example 3*

A lacquer was prepared from ethyl cellulose (having about 46.5% ethoxyl groups) using 10% isopropanol, 65% xylene, and 25% ethyl cellulose. Glass slides were dipped in this lacquer similarly as was done in the preceding examples, the glass slides removed, and immersed in an isopropanol reservoir where they were kept for about 30 minutes. Upon removal of the coated glass slides and drying at about 20–30° C. for a period of about 7 days (instead of the accelerated drying in the previous examples) there was obtained a wrinkle-free coating which had satisfactory adhesion to the glass. When the immersion step in the isobutanol was omitted but otherwise the glass slides were treated in the same manner as above, the cellulosic ether coating on the glass contained numerous wrinkles and strains.

*Example 4*

A cellulose acetate butyrate gel lacquer was prepared from about 25% cellulose acetate butyrate, 68% toluene, and 7% isopropanol. Glass slides were dipped in this gel lacquer similarly as was done in the preceding examples, removed and within a few seconds a hard skin had formed. The coated slides were then immersed, in one instance, in a reservoir of isobutanol and in another instance in a reservoir of isopropanol. After remaining in these alcohols for about 30 minutes, the glass slides were removed and allowed to air dry at room temperature for about a week. At the end of this time, there were obtained in each case optically clear, substantially wrinkle-free, coated glass surfaces having good abrasion resistance. When the glass slides were treated similarly as above with the exception that the immersion in the isopropanol and isobutanol was omitted, and the slides dried again for about a week at room temperature, the coated glass slides showed numerous wrinkles on their surfaces.

*Example 5*

A cellulosic gel lacquer was prepared from 25% cellulose acetate propionate, 68% xylene and 7% isopropanol. The glass slides were again dipped similarly as was done in Example 1, thereafter removed and immediately immersed in a reservoir of isopropanol for about 30 minutes and then air dried at room temperature for about 2 hours and for about 24 hours at 50° C. Again, a clear, wrinkle-free and substantially strain-free surface or coating was obtained which also exhibited good adhesion to the glass. When the same procedure was employed with the glass slides with the exception that the isopropanol immersion was omitted, a wrinkled surface was obtained. The same results were obtained by using a solvent mixture of isopropanol and toluene in place of the isopropanol and xylene.

*Example 6*

An 8-inch television tube was treated by immersing the face portion of the tube in a cellulose acetate propionate gel lacquer similar to the one employed in Example 1 and the television tube was removed slowly from the gel lacquer in such a manner that the face of the tube was at a sufficient angle to allow the excess gel lacquer to drain from the face portion back into the cellulosic gel lacquer tank. Within a few seconds a thin skin had formed on the surface of the coating which was about 100 mils thick. Immediately after removal from the gel lacquer solution, the coated surface was immersed in isobutanol (to a point where the entire coated surface was covered by the isobutanol) for a period of about 60 minutes. The tube was removed from the isobutanol, allowed to air dry at room temperature for 1 hour, 12–14 hours at 60° C., and then the temperature was gradually raised to 100° C. and held there until all the solvent had been removed. This yielded a substantially wrinkle-free, transparent, strain-free, optically clear cellulosic coating which also was highly abrasion-resistant. When a television tube was treated similarly as above, with the exception that the immersion step in isobutanol was omitted, the coating on the tube showed numerous wrinkles, a large number of strained areas, and bubbles.

The attached drawing describes a television tube containing an implosion barrier of the type described above which can be made in accordance with my process.

FIG. 1 is a view, partly cross-sectional, of a television tube 1 whose faceplate portion 2 is covered and protected by an adherent implosion barrier 3.

Figure 2:
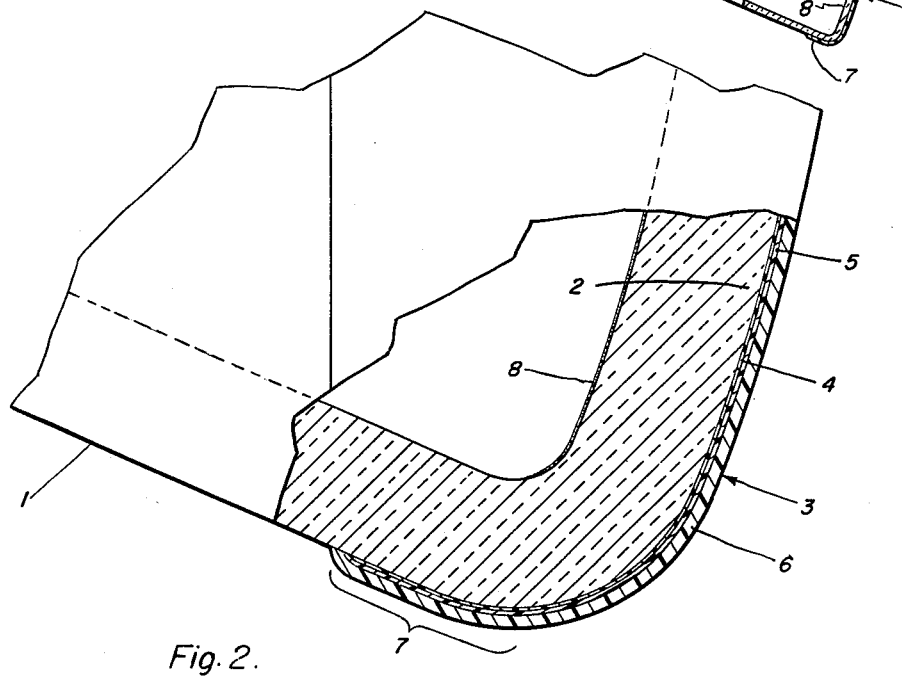

FIG. 2 is a greatly enlarged view of a portion of the implosion-proofed faceplate of FIG. 1, showing the individual organosilane primer coating 4, in the hydrolyzed, polysiloxane state, a vinyl polymer cushioning layer 5, and a cellulosic implosion barrier 6, in a preferred (though by no means only) thickness relationship of these coatings, as well as the anchoring, curving portion 7 of the implosion barrier which adds to the strength of the implosion-proofed cathode ray tube. A luminescent coating 8 is shown on the inside of the image tube.

*Example 7*

Glass slides were dipped in a 10 percent solution of vinyltriethoxysilane in ethanol for a few seconds, removed, allowed to drain, and dried in steam (100% relative humidity) for about 10 minutes to effect hydrolysis of the alkoxysilane to the polysiloxane state. Thereafter, the slides were dried to remove any remaining water, and then in order to apply a cushioning, optically clear layer, immersed in the above-described aqueous polyvinyl acetate emulsion (molecular weight in excess of 200,000). After a few seconds' immersion in the polyvinyl acetate emulsion, the slides were removed, allowed to drain in air for several seconds, and then dried for 30 minutes at a temperature of 35–50° C. for about 15 minutes. The slides were immersed in a cellulose acetate propionate lacquer of the same type and under the same conditions as employed in Example 1, and then dried by immersion in isobutanol in the same manner as shown in Example 1. As a result of this treatment, it was found that the cellulosic film (which was about 25 mils thick) was clear, wrinkle-free and substantially free of strains, and had good optical clarity. To determine the adhesion characteristics as well as the ability of the cellulosic film to resist the effects of high humidity and of changes in temperature, the slides were tested as follows. The edges of each of the slides were cut and removed so that there would be no mechanical sealing of the edges (that is, there would be no wrap-around). Some of the slides were then placed under conditions of changes in temperature ranging from −10° C. to 100° C. for 1 hours at each temperature for 10 cycles. Other samples of the coated slides were placed in a humidity chamber of 100% relative humidity at 55° C. As a result of the heat and cold cycles, no evidence was found that there was a separation of the film from the glass. Even after 14 days in the humidity chamber, again there was no evidence of any separation or lifting of the layers in either the primer or cushion coatings or separation of the cellulosic composition from the undercoatings (and thus from the glass). Similar results of improved adhesion were realized when aminopropyltriethoxysilane was used as the priming agent in place of vinyltriethoxysilane which was hydrolyzed to the polysiloxane state. When glass slides were treated similarly as above with the exception that the polyvinyl acetate cushion coating was omitted, and thereafter the glass slides tested both in the heat cycling and the humidity chamber, failure occurred as evidence by separation of the cellulosic film from the glass. In some instances, the strain introduced into the cellulosic film because of the absence of the cushioning effect of the polyvinyl acetate caused the glass to actually break or shatter. The temperature cycling test conducted on the slides, which did not have the polyvinyl acetate cushion coating, caused delamination of the cellulosic coating from the glass substrate. When the vinylsilane treatment was omitted but the polyvinyl acetate treatment was used prior to coating with cellulosic gel lacquer, the adhesion between the cellulosic gel lacquer and the glass substrate through the medium of the polyvinyl acetate cushion was so poor in the humidity test, that the cellulosic layer pulled away from the glass substrate. The substitution of methyltrichlorosilane and phenyltrichlorosilane for the vinyltriethoxysilane in the primer-cushion system yielded similar results.

*Example 8*

Similar results were obtained as in Example 7 when cellulose acetate butyrate was used in place of the cellulose acetate propionate in Example 7.

*Example 9*

In this example, an 8-inch television viewing tube was treated with a 10% ethanol solution of vinyltriethoxysilane by brushing on the vinyltriethoxysilane solution on the faceplate portion (and around the shoulders) of the tube. The tube was allowed to dry in air (about 40% relative humidity) at room temperature for about 30 minutes to effect hydrolysis of the silane to the polysiloxane state. Thereafter, the primed faceplate was dipped in a 30% aqueous emulsion of polyvinyl acetate and then allowed to air dry for about 1 hour at room temperature, to deposit a clear cushioning layer on the surface of the tube coextensive with the organosilicon coating. The primed and cushioned tube was immersed in a cellulose acetate propionate gel lacquer similar to the one used in Example 1, employing the dipping and removal procedure of Example 6, the tube was removed and dried in the same manner as was used in connection with the glass slides in Example 1, to give a clear, transparent coating on the tube. This coating again was coextensive with the priming and cushion layers. The television tube was then placed in a high humidity chamber (95% relative humidity) at about 38° C. Under this accelerated test, the tube showed no evidence of failure (i.e., delamination or wrinkling of the tube) until after more than 400 hours. When tubes were prepared similarly as above, with the exception that the polyvinyl acetate cushioning layer was omitted, and the tube subjected to the same humidity test, separation of the cellulosic film from the face of the tube occurred in less than 200 hours. When both the vinyltriethoxysilane primer and the polyvinyl acetate cushion were omitted from the treatment of the television tube, the tubes failed in the relative humidity test within 48 hours, that is, the cellulosic film separated from the glass substrate. When a tube was prepared similarly as above made up of the polyvinyl acetate cushion and the cellulose acetate propionate coating, but omitting the vinyl triethoxy silane, the tube began to fail within 160 hours.

*Example 10*

Employing the apparatus and technique described in Schwenker et al. application, Serial No. 210,384, filed concurrently herewith and assigned to the same assignee as the present invention (this application showing an apparatus and extrusion-coating technique directed to the use of cellulosic gel lacquers), a cellulose acetate propionate gel lacquer similar to the one described in Example 1, but differing only in that the solids content was about 27–28%, was charged to the extruder tank described in said Schwenker et al. application, and while the lacquer was maintained at a temperature of about 29° C., so that the lacquer was essentially a gel, a rubbery, elastic sheet of the gel was extruded through a slit-shaped opening in the tank onto the faceplate of a television tube. Prior to extrusion of the cellulosic gel, the faceplate of the television tube had been primed with vinyltriethoxysilane, the latter hydrolyzed to the polysiloxane state, and thereafter coated with a thin layer of polyvinyl acetate, all in accordance with the method described in the aforesaid Example 7. After extrusion of the cellulosic gel onto the faceplate (and around the shoulders of the television tube), the coated tube was immersed in an isobutanol reservoir for about 30 minutes, removed, and allowed to air dry until the balance of the solvent had evaporated. The implosion barrier of cellulose acetate propionate obtained by means of this procedure (which was about 25 mils thick) was smooth, optically clear, water white, and wrinkle-free. In addition, testing of the implosion barrier under varying temperature conditions and under elevated humidity conditions (as described previously) revealed no evidence of lifting or delamination of the cellulose acetate propionate layer. In fact even after some 300 hours under 95% humidity at 38° C. (which is a probably more severe test than will be encountered in actual use), there was no evidence of any undesirable change (e.g., wrinkling, delamination, etc.) in the appearance or characteristics of the implosion-proofed television tube. When this tube, positioned in a television cabinet, was tested for safety by striking the face of the tube, even though the glass shattered, none of the glass escaped the confines of the cabinet or the implosion barrier.

It will of course be apparent to those skilled in the art that instead of using the cellulosic compositions described in the foregoing examples, other cellulosic compositions referred to previously, may be employed in place of those used in the express examples, without departing from the scope of the invention. Furthermore, the type of swelling agent used may also be varied and again, these swelling agents which can be used have been referred to previously in the application. Although numerous monohydric aliphatic alcohols have been described as being used in the foregoing examples, there are still other alcohols, many examples of which have been given above, including unsaturated monohydric aliphatic alcohols, which can be employed within the intended scope of the invention.

There are many organosilane treatments which can be employed for priming the various surfaces, particularly the glass surface, in addition to the vinylsilane used in the foregoing examples. Examples of treatment of glass surfaces with organosilicon compositions to improve their adhesion to various plastic (e.g., polymeric) coatings can be found in U.S. Patents 2,834,693—Jellinek, 2,563,288—Steinman, 2,891,885—Brooks, 2,951,057—Wiese et al., 2,971,864—Speier, 3,013,915—Morgan, 2,962,390—Fain, etc., which by reference are made part of the disclosures of the instant application. These organosilanes containing the desired hydrolyzable groups can readily be converted to the polysiloxane state to improve the adhesion of the polymeric cushioning coating interposed between the cellulosic coating and the organosilane coated glass surface. In addition, vinyl acetate and copolymers of vinyl acetate, many examples of which have been given above, have been used successfully as a cushioning liner between the primed glass surface and the cellulosic coating.

Obviously, the procedures and times used in applying the various layers to the faceplate of the television tube can be varied within wide limits, as is clearly pointed out earlier in the application. As thicker cellulosic coatings are used, thicker coatings of the polymer cushion should also be used to dissipate the strains introduced by the thicker coating of the cellulosic surface. Prior to applying the cellulosic gel lacquer, tinting aids, contrasting agents, etc., may be added to the former to improve the quality of the televised image. The cellulosic surface may also be treated with suitable agents to reduce undesirable reflection of the surface and to minimize charging of the surface due to static electricity and capacitance charging. The organosilane primer and the polymer cushion can be applied by any of the well known means, for example, spraying, brushing, dipping, etc. The cellulosic composition or cellulosic gel lacquer in addition to being applied by the dipping procedures described above can also be applied by means of the flow-coating technique in the manner described in the aforesaid application of Schwenker et al.

Obviously, the aliphatic alcohols in which the surface is coated with the cellulosic composition is immersed and can be varied widely and can be the same or different than the aliphatic alcohol used for making the cellulosic gel lacquer. At least 20% of the swelling agent should be removed in the immersion step. Although up to 100% of the swelling agent can be removed while immersed in the aliphatic alcohol, this is usually not necessary, especially since the time required for such removal may be undesirably long for commercial utilization. If less than 20% of the swelling agent is removed, little advantage will be derived in preventing wrinkling of the cellulosic surface or the introduction of strains.

In addition to coating glass surfaces (e.g., television tubes, light bulbs, photographic flash bulbs, etc.), the cellulosic gel lacquers can be used to coat other surfaces, for instance, wood, metal, etc., for both protective and decorative purposes. The optically clear, transparent coatings obtained in accordance with my process can be used to coat bowling pins to impart thereto a pleasing, wrinkle-free, homogeneous, transparent, tightly adherent and abrasion resistant coating using the cellulosic gel lacquers described in the instant application. Table tops can be coated with the cellulosic gel lacquer to give smooth, wrinkle-free, tightly adherent coatings by employing the procedure described in the instant application.

What I claim as new and desire to secure by Letters Patent of the United States is:

1. The process for making a highly adherent, wrinkle-free, strain-free, transparent, implosion proof television tube which comprises (1) applying to the face portion of the television tube an organosilicon priming agent, (2) applying a polymeric vinyl ester cushioning layer to the organosilicon primed glass, (3) applying a cellulosic gel lacquer to the cushioning layer, the said gel lacquer comprising (a) a cellulosic composition selected from the class consisting of cellulose acetate, cellulose butyrate, cellulose propionate, cellulose acetate butyrate, cellulose acetate propionate, and ethyl cellulose, (b) an inert swelling liquid for the cellulosic composition, and (c) a non-solvent aliphatic alcohol of at least two carbon atoms, the combined effect of (b) and (c) acting as a solvent mixture for the cellulosic composition and (4) submerging the coated cellulosic surface in an aliphatic alcohol for a time sufficient to remove at least 20 percent of the swelling agent present in the solvent mixture for the cellulosic composition.

2. The process as in claim 1 in which after immersion in the aliphatic alcohol to remove the inert swelling agent, the coated television tube is then allowed to dry outside the aliphatic alcohol for a time sufficient to volatilize essentially all the remaining swelling agent and aliphatic alcohol present in the cellulosic coating.

3. The process for making a strongly adherent, wrinkle-free, strain-free, transparent, implosion proof television tube which comprises (1) applying to the face plate of the television tube an organosilicon priming agent, (2) applying a polymeric vinyl ester cushioning layer to the organosilicon primed glass, (3) applying a cellulosic gel layer to the cushioning layer, the said gel lacquer comprising (a) a cellulosic composition comprising cellulose acetate propionate, (b) toluene, and (c) isobutanol, and (4) immersing the coated cellulose acetate propionate surface in isobutanol until at least 20 percent of the toluene in the gel lacquer is removed.

4. The process for preparing an adherent, wrinkle-free, strain-free, transparent, implosion proof cathode ray tube which comprises (1) applying to the face plate of the television tube an organosilicon priming agent, (2) applying a vinyl ester polymer cushioning layer to the organosilicon primed glass, (3) applying a cellulosic gel lacquer to the cushioning layer, the said gel lacquer comprising (a) ethyl cellulose, (b) isopropanol, and (c) xylene, and (4) immersing the coated ethyl cellulose surface in isobutanol until at least 20 percent of the xylene from the ethyl cellulose coating is removed.

5. The process for preparing an adherent, wrinkle-free, transparent, implosion-resistant cathode ray tube which comprises (1) applying to the face plate of the television tube an organosilicon priming agent, (2) applying a vinyl ester polymer cushioning layer to the organosilicon primed glass, (3) applying a cellulosic gel lacquer to the cushioning layer, the said gel lacquer comprising (a) cellulose acetate butyrate, (b) isopropanol, and (c) toluene, and (4) immersing the coated cellulose acetate butyrate surface in isopropanol for a time sufficient to remove at least 20 percent of the toluene in the cellulose acetate butyrate.

6. The process for preparing an adherent, wrinkle-free, strain-free, transparent, implosion proof television tube which comprises (1) applying to the face plate of the television tube an organosilicon priming agent, (2) applying a vinyl ester polymer cushioning layer to the organosilicon primed glass, (3) applying a cellulosic gel lacquer to the cushioning layer, the said gel lacquer comprising (a) cellulose acetate propionate, (b) xylene, and (c) isopropanol, and (4) immersing the coated cellulose acetate propionate surface in isopropanol for a time sufficient to remove at least 20 percent of the xylene from the cellulose acetate propionate coating.

7. A cathode ray tube containing on its outer face surface an implosion barrier selected from the class consisting of cellulose acetate, cellulose butyrate, cellulose propionate, cellulose acetate butyrate, cellulose acetate propionate, and ethyl cellulose, attached to the glass substrate through the medium of an organopolysiloxane priming agent and a polyvinyl acetate cushion layer.

8. An implosion resistant cathode ray tube containing a cellulose acetate propionate implosion barrier bonded to the glass substrate by means of a primer-cushion system composed of an organopolysiloxane primer and a polyvinyl acetate cushioning layer between the organopolysiloxane primer and the cellulose acetate propionate implosion barrier.

9. An implosion resistant cathode ray tube containing an ethyl cellulose implosion barrier bonded to the glass substrate by means of a primer-cushion system composed of an organopolysiloxane primer and a polyvinyl acetate cushioning layer between the organopolysiloxane primer and the ethyl cellulose implosion barrier.

10. An implosion resistant cathode ray tube containing a cellulose acetate butyrate implosion barrier bonded to the glass substrate by means of a primer-cushion system composed of an organopolysiloxane primer and a polyvinyl acetate cushioning layer between the organopolysiloxane primer and the cellulose acetate butyrate implosion barrier.

11. An implosion resistant cathode ray tube containing a cellulose acetate propionate implosion barrier bonded to the glass substrate by means of a primer-cushion system composed of a vinylpolysiloxane primer and a polyvinyl acetate cushioning layer attached to and between the vinylpolysiloxane polymer and the cellulose acetate propionate implosion barrier.

References Cited by the Examiner

UNITED STATES PATENTS

| | | | |
|---|---|---|---|
| 2,152,867 | 4/39 | Bright | 273—58.1 |
| 2,289,537 | 7/42 | Bright | 117—102 |
| 2,293,529 | 8/42 | Bedford | 117—124 |
| 2,357,458 | 9/44 | Clough | 117—73 |
| 2,557,786 | 6/51 | Johannson | 117—124 |
| 2,772,986 | 12/56 | Buck | 117—73 |
| 2,781,654 | 2/57 | Pipkin | 67—31 |
| 3,022,653 | 2/62 | Baird | 117—94 |

RICHARD D. NEVIUS, Primary Examiner.